Nov. 15, 1966  H. W. FIX  3,285,391
ACCUMULATION CONVEYOR
Filed Oct. 14, 1965  2 Sheets-Sheet 1
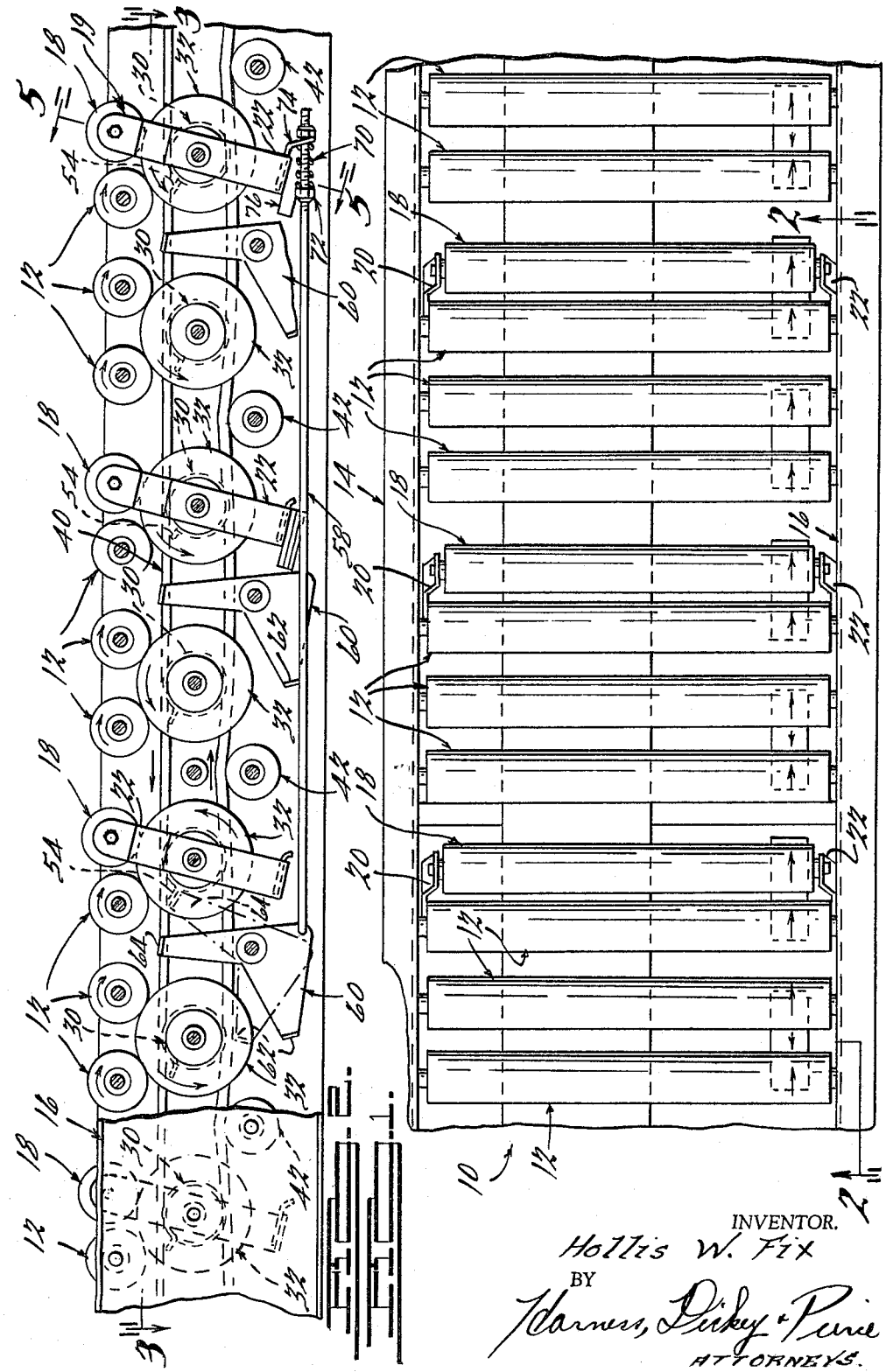
INVENTOR.
Hollis W. Fix
BY
Harness, Dickey & Pierce
ATTORNEYS.

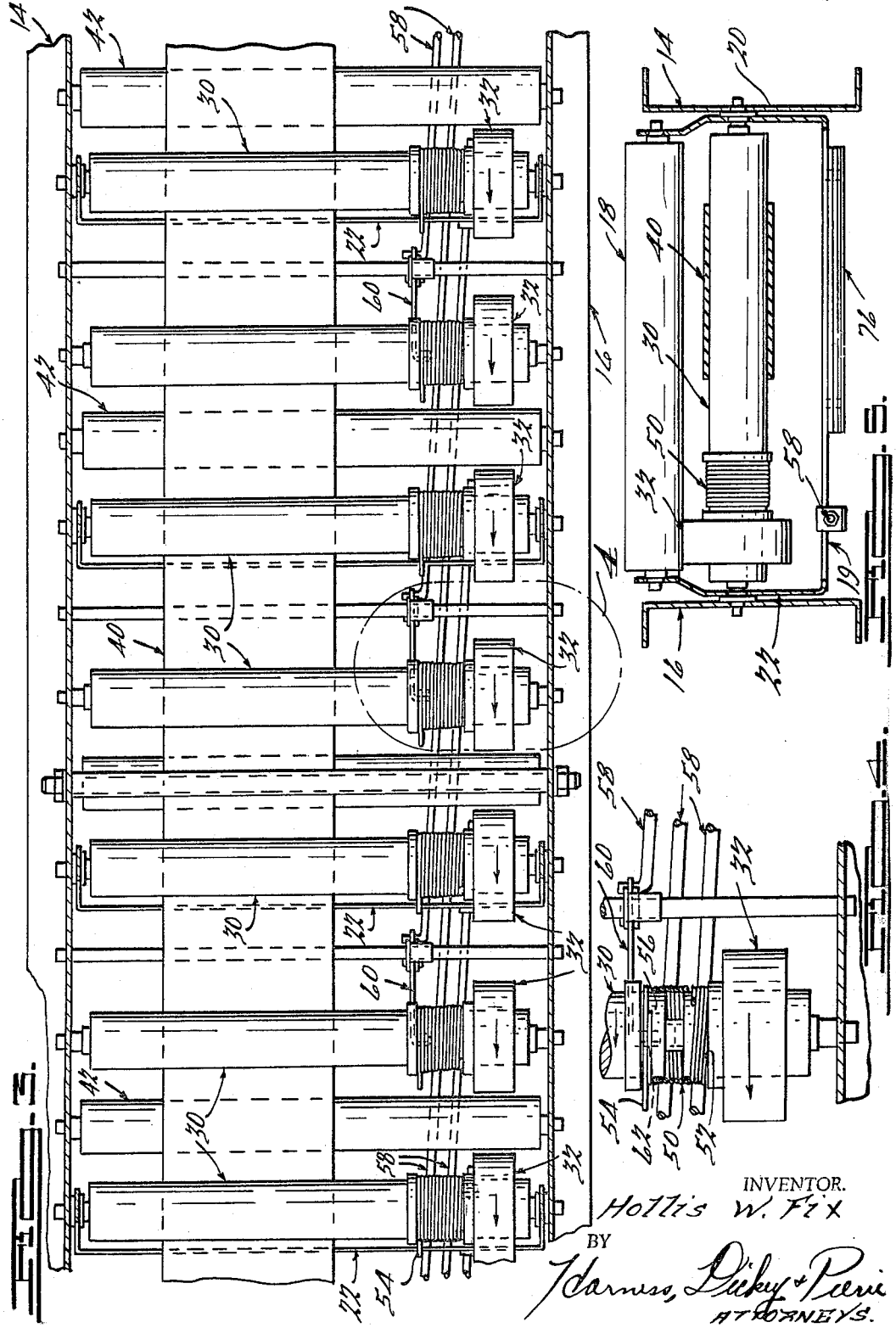

United States Patent Office 3,285,391
Patented Nov. 15, 1966

3,285,391
ACCUMULATION CONVEYOR
Hollis W. Fix, Whittier, Calif., assignor to Fruehauf Corporation, Detroit, Mich., a corporation of Michigan
Filed Oct. 14, 1965, Ser. No. 496,075
4 Claims. (Cl. 198—127)

This application relates generally to conveyors and more particularly to an improved accumulation conveyor.

Warehousing of materials in modular containers has materially expedited the handling of goods and materials. Often times materials are stored in a given area within a warehouse and thereafter called out electronically, mechanically deposited on a powered conveyor system, and thereafter transported to a central marshalling or loading area.

However, a problem has developed in utilization of powered conveyor systems to convey such containers between storage areas and the point of discharge. When the containers are not removed from the powered conveyor as rapidly as they are placed thereon containers become stacked up from the discharge point. Since such conveyors generally utilize driving rolls which turn on the bottoms of the respective containers, the drive rolls may scrub on the bottom of the containers ultimately leading in failure of the container and severely loading the power drive train of the conveyor.

This problem is solved, in accordance with the instant invention, by a novel control system for the drive rolls of the conveyor. In the conveyor of the present invention, load rolls are rotated by means of rubber drive rolls that are coupled to power rolls by a spring clutch. The power rolls are, in turn, driven by a continuously moving belt. The spring clutch is designed so that each power roll is constantly driven whereas the powers train between the power roll and drive roll is interrupted upon sensing of a stacked up condition by the control system.

Disengagement of selected spring clutches is effected by a novel control system comprising a lever mechanism that is actuated by engagement between an impeded container and an upstanding clutch release actuating roll. The control system features a lever that is fulcrumed for rotation about the axis of rotation of the drive rolls. The lever is rotated upon engagement with an impeded container to bring a second lever into engagement with one end of the clutch spring thereby to deenergize a rearwardly spaced drive roll. Thus while the clutch release roll is held in the depressed condition the spring clutch for the drive roll is released and no power is transmitted between the associated power roll and drive roll. As containers accumulate, power is released on preceeding rolls minimizing pressure build up on the blocked conveyor items. When the obstruction is removed from the front of the first accumulated container, it moves forward due to the fact that at least one roll under the first container remains powered. Succeeding containers then proceed forwardly as spaces occur and successive drive rolls are re-powered.

Accordingly, one object of the instant invention is an improved accumulation conveyor.

Another object is an improved control system for an accumulation conveyor.

Another object is an improved clutch and control for an accumulation conveyor.

Other objects and advantages of the instant invention will be apparent from the following detailed description of the specification, claims and drawings, wherein:

FIGURE 1 is a top view of an accumulation conveyor in accordance with the instant invention;

FIG. 2 is a cross sectional view taken substantially along the line 2—2 of FIG. 1;

FIG. 3 is a view taken substantially along the line 3—3 of FIG. 2;

FIG. 4 is a view taken substantially within the circle "4" of FIG. 3, and

FIG. 5 is a view taken substantially along the line 5—5 of FIG. 2.

As best seen in FIGURE 1 of the drawings, an accumulation conveyor 10, in accordance with an exemplary constructed embodiment of the instant invention, comprises a plurality of spaced, parallel, driven, load supporting rolls 12 for the support of containers or other articles (not shown) desired to be moved from place to place by the conveyor 10. The load supporting driven rolls 12 are journaled in conventional bearings in a pair of longitudinally extending side rails 14 and 16.

In accordance with a constructed embodiment of the instant invention, a sensing roll 18 is located after every third load supporting roll 12 and normally slightly elevated relative thereto. However, in practice it is anticipated that sensing roll spacing will vary to suit different sizes of conveyor loads. Each sensing roll 18 is supported on a generally U-shaped yoke 19 having a pair of spaced arms 20 and 22 for the support of the rolls 18. Each yoke 19 is supported for rotation so as to raise and lower the sensing rolls 18, as will be discussed hereinafter.

As best seen in FIGURE 3 of the drawings, a plurality of power rolls 30 and drive rolls 32 are coaxially aligned with one another for rotation about an axis extending parallel to the axis of rotation of the load rolls 18. The power and drive rolls 30 and 32, respectively, are journaled in the side frames 14 and 16 by conventional bearings. Each drive roll 32 engages at least one load roll 12 to drive it in the clockwise direction as seen in FIG. 2.

A continuously driven belt 40 overlies the power rolls 30 so as to rotate the power rolls 30 and drive rolls 32 counterclockwise as seen in FIGURE 2 of the drawings. Suitable idler rolls 42 are provided to maintain the lower side of the belt 40 in engagement with the lower surface of the drive rolls 30.

As best seen in FIGURE 4 of the drawings, torque is transmitted from each power roll 30 to its associated drive roll 32 by a helical coil spring clutch 50. One end portion 52 of the coil spring 50 frictionally grips the end portion of the drive roll 32. The other end portion 54 of the coil spring 50 frictionally grips the end portion 56 of the constantly rotating power roll 30. The coil spring 50 is wound with a left hand helix so that rotation of the power roll 30 in the direction shown in FIGURE 4, tends to wind up the coil spring 50 and thereby increase its holding power on an end portion 56 of the drive roll 30. Thus, so long as the end portion 54 of the spring 50 is free to rotate, the coil spring 50 tends to close down on the end portion 56 of the power roll 30.

It is to be noted that the drive rolls free wheel if a load is propelled along the conveyor faster than the conveyor running speed. Further, when end portion 54 of spring 50 is free to rotate and coils wind up holding power increase on the end of roll 32 the same as on the end portion 56 of roll 30.

In accordance with yet another feature of the instant invention, a control system for each drive roll 32 comprises a push rod 58 having one end portion 72 connected to the U-shaped yoke 19.

Movement of the push rod 58 to the left under the influence of the yoke 19 is transmitted to a clutch yoke 60 having a pair of fingers 62 and 64 thereon that are engageable with the end portions 54 of adjacent coil springs 50. As best seen in FIGURE 2 of the drawings, the yoke 60 is rotatable clockwise into a position wherein the fingers 62 and 64 thereof engage the end portion 54 of an associated spring 50 to in effect unwind the spring 50 from the end portion 56 of an associated power roll 30 thereby to permit slippage between the power roll 30 and the drive roll 32.

It is to be noted that the yoke 19 is rotatable about the axis of rotation of the power roll 30 and the drive roll 32. Therefore each sensing roll 18 is at all times in engagement with an associated drive roll 32. Thus, even though the sensing roll 18 may be biased clockwise by a container to effect disengagement of a preceding pair of drive rolls 32 from their associated power rolls 30, the particular sensing roll 18 that is biased downwardly by a container continues to rotate thereby exerting a starting torque on the container tending to move the container along the conveyor 10 when an obstruction is relieved. A spring 70 is a safety buffer to prevent damage if fingers 62 and 64 come down on end portions 54 of springs 50. Counterclockwise bias is applied to yoke 19 by a counterweight 76 permanently attached to yoke 19.

From the foregoing description it should be apparent that the instant invention provides for selective declutching of the load supporting driven rolls of a conveyor in accordance with a load stoppage condition sensed by suitable sensing rolls. The control system de-energizes novel spring clutches to effect disengagement of the drive rolls 32 from their associated power rolls 30. Furthermore, the sensing rolls 18 remain powered to facilitate movement of the container when the stoppage condition is alleviated.

It is to be understood that the specific construction of the improved conveyor herein disclosed and described is presented for the purpose of explanation and illustration and is not intended to indicate limits of the invention, the scope of which is defined by the following claims.

What is claimed is:
1. An accumulation conveyor comprising
   a plurality of load supporting driven rolls,
   a continuously rotating power roll underlying said drive rolls extending generally parallel thereto in spaced relation,
   a continuously moving belt drivably engaged with said power roll,
   a drive roll coaxially aligned with said power roll,
   a releasable clutch between said power and drive rolls comprising a helical coil spring, one end of said coil spring drivably coiled about said drive roll and the other end being drivably coiled about said power roll, and
   means engageable with the other end of said spring to effect uncoiling thereof and release of its driving engagement with said power roll.

2. An accumulation conveyor comprising
   a plurality of load supporting driven rolls,
   a continuously rotating power roll underlying said drive rolls extending generally parallel thereto in spaced relation,
   a continuously moving belt drivably engaged with said power roll,
   a drive roll coaxially aligned with said power roll,
   a releasable clutch between said power and drive rolls comprising a helical coil spring, one end of said coil spring drivably coiled about said drive roll and the other end being drivably coiled about said power roll,
   a sensing roll normally extending into the path of an object supported by said driven rolls and movable thereby, and
   means controlled by said sensing roll engageable with the other end of said spring to effect uncoiling thereof and release of its driving engagement with said power roll.

3. An accumulation conveyor comprising
   a plurality of load supporting driven rolls,
   a continuously rotating power roll underlying said drive rolls extending generally parallel thereto in spaced relation,
   a continuously moving belt drivably engaged with said power roll,
   a drive roll coaxially aligned with said power roll,
   a releasable clutch between said power and drive rolls comprising a helical coil spring, one end of said coil spring drivably coiled about said drive roll and the other end being drivably coiled about said power roll,
   a sensing roll drivably engaged with a drive roll and normally extending into the path of an object supported by said driven rolls and movable thereby,
   means controlled by said sensing roll and means engageable with the other end of said spring to effect uncoiling thereof and release of its driving engagement with said power roll.

4. A conveyor in accordance with claim 3 wherein said sensing roll is pivoted for movement by said object about the axis of rotation of said drive roll to maintain said engagement therebetween.

No references cited.

EVON C. BLUNK, *Primary Examiner.*

M. L. AJEMAN, *Assistant Examiner.*